_United States Patent_ [19]

Nishio et al.

[11] Patent Number: 4,957,966

[45] Date of Patent: Sep. 18, 1990

[54] THERMOPLASTIC RESIN COMPOSITION

[75] Inventors: Taichi Nishio; Hiroomi Abe; Yasurou Suzuki; Takashi Sanada; Satoru Hosoda, all of Chiba; Takayuki Okada, Ehime, all of Japan

[73] Assignee: Sumitomo Chemical Company, Ltd., Osaka, Japan

[21] Appl. No.: 203,187

[22] Filed: Jun. 7, 1988

[30] Foreign Application Priority Data

Jun. 10, 1987 [JP] Japan ................. 62-145463

[51] Int. Cl.$^5$ ............. C08L 71/12; C08L 77/00
[52] U.S. Cl. ..................... 525/66; 525/68; 525/92; 525/391; 525/396; 525/397; 525/905
[58] Field of Search ............... 525/397, 905, 66, 68, 525/92, 395, 396

[56] References Cited

U.S. PATENT DOCUMENTS

| | | | |
|---|---|---|---|
| 3,306,874 | 2/1967 | Hay | 528/215 |
| 4,315,086 | 2/1982 | Ueno et al. | |
| 4,600,741 | 7/1986 | Aycock | 525/132 |
| 4,873,276 | 10/1989 | Fujii et al. | |

FOREIGN PATENT DOCUMENTS

| | | |
|---|---|---|
| 164767 | 12/1985 | European Pat. Off. |
| 182163 | 5/1986 | European Pat. Off. |
| 56-47431 | 4/1981 | Japan |
| 56-49753 | 5/1981 | Japan |
| 60-11966 | 3/1985 | Japan |
| 61-120855 | 6/1986 | Japan |
| 61-204261 | 9/1986 | Japan |
| 61-296061 | 12/1986 | Japan |
| 6281449 | 4/1987 | Japan |

_Primary Examiner_—Jacob Ziegler

_Attorney, Agent, or Firm_—Cushman, Darby and Cushman

[57] ABSTRACT

A novel thermoplastic resin composition comprising a matrix of polyamide resin (E) and a disperse phase of a composition (D), said composition (D) comprising a polyphenylene ether (A), a rubber-like materail (B) and a mutual compatibilizer (C), said polyphenylene ether (A) being obtained from at least one phenol compound represented by the formula:

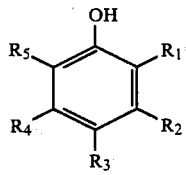

wherein $R_1$, $R_2$, $R_3$, $R_4$ and $R_5$ represents a hydrogen atom, a halogen atom or a substituted or unsubstituted hydrocarbon residue, with a proviso that at least one of them is a hydrogen atom, and said polyphenylene ether (A) having a reduced viscosity $\eta_{sp/c}$ of 0.40–0.58 deciliter/gram, said mutual compatibilizer (C) being compatible or reactive with said polyphenylene ether and reactive with said polyamide resin, and said polyamide resin (E) having a number average molecular weight of 14,000–40,000 and an end amino group content of 50–95 mmole/kg, wherein the thermoplastic resin composition constitutes 1–65 wt. % of said polyphenylene ether (A), 1–20 wt. % of said rubber-like material (B), 0.01–5 wt. % of said mutual compatibilizer (C) and 35–97.99 wt. % of said polyamide resin (E), based on the total weight of said thermoplastic resin composition, and the weight average particle size of said disperse phase is 2 micron or less.

9 Claims, No Drawings

THERMOPLASTIC RESIN COMPOSITION

This invention relates to a novel thermoplastic resin composition which can be made into shaped articles, sheets, films, etc. by injection molding, extrusion molding, etc.

More particularly, it relates to a resin composition which comprises a disperse phase of polyphenylene ether, a matrix phase of polyamide and a mutual compatibilizer which is reactive or compatible with both said disperse and matrix phases. The resin composition is excellent in heat resistance, mechanical properties and processability.

Polyphenylene ether is thermoplastic resin superior in various mechanical properties, heat resistance, electrical properties, chemical resistance, hot water resistence, flame resistance and dimension stability, but inferior in processability due to high melt viscosity and relatively inferior in impact resistance.

A composite material comprising polyphenylene ether and polystyrene is proposed in order to lessen melt viscosity of polyphenylene ether and to improve processability thereof, leaving various other good properties of polyphenylene ether unchanged. However, such inherent good properties of polyphenylene ether as heat resistance, flame resistance and chemical resistance are somewhat damaged when enough polystyrene is added to provide practical processability. No sufficient improvement is seen in impact resistance, either, even after polystyrene is added.

On the other hand, polyamide is a thermoplastic resin characterized in its heat resistance, stiffness, strength, oil resistance, etc., but often inferior in impact resistance. In order to improve such impact resistance, rubber component has been blended or copolymerized with the polyamide. However, the rubber component causes heat resistance and surface hardness to considerably degrade. Such crystalline thermoplastic resin is easy to shape since it has a low melt viscosity. However, it, in turn, has a limited shaping condition since it readily solidifies at a temperature slightly lower than its crystallization temperature. Besides, the crystalline thermoplastic resin is great in changes of properties and dimension in practical use. Thus, further improvements have been desired. In addition, many of heat resistant crystalline thermoplastic resins are high in water absorption and has a problem on its appearance as well as the changes of properties and dimension.

Development is expected in new applications if a resin composition is prepared in which polyphenylene ether and a polyamide are blended, maintaining favorite properties of both components and having improved processability and impact strength.

However, polyphenylene ether and polyamide are greatly different in melt viscosity from each other and they are very poor in compatibility. Simple blending of them encounters the following difficulties:

1. hardness in stable take-up of strands extruded and greatly lower processability in molding, because their melt viscosity difference is very large; and
2. no improvement in mechanical properties of the shaped articles, particularly in impact resistance, but often rather lower than expected on the basis of their respective values.

One approach to solve these problems is addition of additives having reactivity or compatibility to system of polyphenylene ether and polyamide as disclosed in Japanese Patent Publication (Kokoku) No. 60-11966 and Japanese Patent Publication (Kokai) Nos. 56-47432, 57-10642 and 60-58463. Especially, the methods disclosed in Japanese Patent Publication (Kokoku) No. 60-11966 and Japanese Patent Publication (Kokai) No. 56-47432 afford good effect, but impact strength is not enough.

Furthermore, Japanese Patent Publication (Kokai) Nos. 56-49753, 57-10642, 57-165448 and 59-66452 disclose the use of reactive additives with modified polystyrene, polyphenylene ether or rubber. However, these publications have not studied on disperse phase, nor specified the particle size or the morphology of polyphenylene ether when it constitutes disperse phase. Therefore, such composition is out of balance between impact resistance and heat resistance and besides improvement of impact resistance is still insufficient.

As a result of the inventors' wide-ranging and intensive researches and investigations on improvement of resin compositions comprising a polyphenylene ether and a polyamide, it has been found that a resin composition which has a good balance between heat resistance and impact resistance, a remarkably-improved impact resistance and a good processability, is obtained by combining a mutual compatibilizer with a composition comprising a disperse phase of polyphenylene ether and a matrix phase of polyamide, specifying the particle size of the disperse phase and controlling the morphology of the composition.

That is, this invention relates to a thermoplastic resin composition comprising a matrix of polyamide resin (E) and a disperse phase of a composition (D) which is obtained by melting and mixing the polyamide resin (E) and the composition (D), said composition (D) being obtained by melting and mixing a polyphenylene ether (A) together with a rubber-like material (B) and a mutual compatibilizer (C), said polyphenylene ether (A) being obtained by oxidation polymerization of at least one phenol compound represented by the formula:

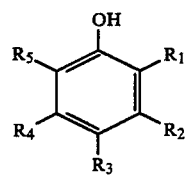

wherein $R_1$, $R_2$, $R_3$, $R_4$ and $R_5$ represent a hydrogen atom, a halogen atom or a substituted or unsubstituted hydrocarbon residue, with a proviso that at least one of them is a hydrogen atom, said polyphenylene ether (A) having a reduced viscosity $\eta_{sp/c}$ of 0.40–0.58 deciliter/gram, said mutual compatibilizer (C) being compatible or reactive with said polyphenylene ether and reactive with said polyamide resin, said polyamide resin (E) having a number average molecular weight of 14,000–40,000 and an end amino group content of 50–95 mmole/kilogram, wherein the thermoplastic resin composition constitutes 1–65 wt % of said polyphenylene ether (A), 1–20 wt % of said rubber-like material (B), 0.01–5 wt % of said mutual compatibilizer (C) and 35–97.99 wt % of said polyamide resin (E), based on the total weight of said thermoplastic resin composition, and wherein said dispersion phase has a weight average particle size of 2 microns or less.

In particular, this composition is characterized in that the disperse phase contains a rubber-like material (B)

therein and that a mutual compatibilizer (C) is grafted to the polyphenylene ether, thereby improving the compatibility between the disperse phase and the polyamide matrix.

Polyphenylene ether (A) used in the present invention is a polymer obtained, for example, by oxidation polymerization of one or more of phenol compounds having the formula:

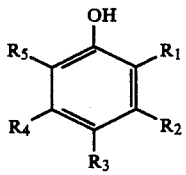

wherein $R_1$, $R_2$, $R_3$, $R_4$ and $R_5$ represent a hydrogen atom, a halogen atom or a hydrocarbon residue substituted or not and at least one of them is a hydrogen atom, with molecular oxygen or gas containing the same in the presence of an oxidation coupling catalyst.

Examples of $R_1$–$R_5$ are a hydrogen atom, a chlorine atom, a bromine atom, a fluorine atom and an iodine atom, a methyl group, an ethyl group, an n- or iso-propyl group, a pri.-, sec.- or tert.-butyl group, a chloroethyl group, a hydroxyethyl group, a phenylethyl group, a benzyl group, a hydroxymethyl group, a carboxyethyl group, a methoxycarbonylethyl group, a cyanoethyl group, a phenyl group, a chlorophenyl group, a methylphenyl group, a dimethylphenyl group, an ethylphenyl group, and an allyl group.

Examples of the phenol compound as shown in the above formula are phenol, o-, m- or p-cresol, 2,6-, 2,5-, 2,4- or 3,5-dimethylphenol, 2-methyl-6-phenylphenol, 2,6-diphenylphenol, 2,6-diethylphenol, 2-methyl-6-ethylphenol, 2,3,5-, 2,3,6- or 2,4,6-trimethylphenol, 3-methyl-6-t. butylphenol, thymol and 2-methyl-6-allylphenol. Alternatively, copolymer of any of the phenol compound listed above and the other phenol compound, for example, polyhydroxy aromatic compound, may be employed. The polyhydroxy aromatic compound is, for example, bisphenol A, tetrabromobisphenol A, resorcin, hydroquinone and novolack resin.

Preferably polymers are homopolymer of 2,6-dimethylphenol or 2,6-diphenylphenol and copolymers of a large amount of 2,6-xylenol and a small amount of 3-methyl-6-t-butylphenol or of 2,3,6-trimethylphenol.

Any oxydation coupling catalyst may be employed for oxydation polymerization of phenol compound, as long as it has polymerization ability. Examples are cuprous compound/tert. amine such as cuprous chloride/triethylamine and cuprous chloride/pyridine; cupric compound/amide/alkali metal hydroxide such as cupric chloride/pyridine/potassium hydroxide; manganese salt/primary amine such as manganese chloride/ethanolamine and manganese acetate/ethylenediamine; manganese salt/alcolate or phenolate such as manganese chloride/sodium methylate and manganese chloride/sodium phenolate; and cobalt salt/tert. amine.

Polymerization temperature for preparing polyphenylene ether is 40° C. or higher (high temperature polymerization) or lower (low temperature polymerization). Either temperature may be used, although polymers produced thereby have different properties.

Polyphenylene ether (A) further includes that grafted with styrenic polymer or other polymer. For instance, grafted one is obtained by graft-polymerizing styrene monomer and/or other comonomer in the presence of polyphenylene ether and organic peroxide (Japanese Patent Publications (Kokoku) 47-47862, 48-12197, 49-5623, 52-38596 and 52-30991) or by melt-kneading polyphenylene ether and polystyrene in the presence of a radical initiator (Japanese Patent Publication (Kokai) 52-142799).

Polyphenylene ether (A) preferably has a reduced viscosity $\eta_{sp/c}$ of 0.40–0.58 deciliter/gram, more preferably 0.45–0.52 deciliter/gram, as measured at 25° C. in chloroform. If the reduced viscosity is less than 0.40 deciliter/gram or more than 0.58 deciliter/gram, the size of dispersed polyphenylene particles becomes larger and thus impact resistance decreases.

The polyamides used in the present invention may be those obtained by polycondensation of lactams of three or more membered rings, polymerizable ω-amino acids, dibasic acids with diamines, etc. As typical examples thereof, mention may be made of polymers of ε-caprolactam, aminocaproic acid, enantholactam, 7-aminoheptanoic acid, 11-aminoundecanoic acid, etc., polymers obtained by polycondensation of diamines such as hexamethylenediamine, nonamethylenediamine, undecamethylenediamine, dodecamethylenediamine, m-xylylenediamine, etc. with dicarboxylic acids such as terephthalic acid, isophthalic acid, adipic acid, sebacic acid, dibasic dodecanoic acid, glutaric acid, etc., or copolymers thereof.

Typical examples of said polyamides are aliphatic polyamides such as polyamide 6, polyamide 6,6, polyamide 6,10, polyamide 11, polyamide 12, polyamide 6,12, etc. and aromatic polyamides such as polyhexamethylenediamine terephthalamide, polyhexamethylenediamine isophthalamide, xylene group-containing polyamides, etc. These may also be used as mixtures or copolymers of two or more of them.

The mutual compatibilizer (C) used in the present invention means that which keeps stable both the disperse phase of polyphenylene ether and the matrix phase of polyamide and prevents the degradations of appearance and properties when the composition is used.

More specifically, the mutual compatibilizer (C) is at least one compound selected from the compounds which are compatible or reactive with polyphenylene ether and contain in the molecule at least one of carboxyl group, acid anhydride group, acid amide group, imide group, carboxylate ester group, epoxy group, amino group, isocyanate group, a group containing oxazoline ring and hydroxyl group.

Examples of these compounds are aliphatic carboxylic acids, aromatic carboxylic acids, esters, acid anhydrides and acid amides of these acids, imides derived from these acids and/or acid anhydrides, aliphatic glycols or phenols, isocyanates such as toluene diisocyanate and methylenebis-(4-phenyl isocyanate), oxazolines such as 2-vinyl-2-oxazoline, epoxy compounds such as epichlorohydrin and glycidyl methacrylate, aliphatic amines, aliphatic diamines, aliphatic triamines, aliphatic tetramines, aromatic amines such as m-phenylenediamine, 4,4'-methylenedianiline, benzidine, etc.

The following unsaturated compounds are more preferred.

Typical examples are maleic anhydride, maleic acid, fumaric acid, maleimide, maleic acid hydrazide, a reaction product of maleic anhydride and diamine, e.g., compounds having the formulas

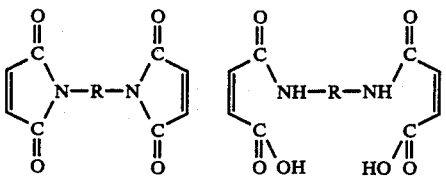

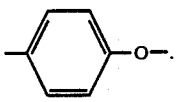

wherein R is an aliphatic or aromatic group, methylnadic anhydride, dichloromaleic anhydride, maleic acid amide and, natural fats and oils such as soybean oil, tung oil, caster oil, linseed oil, hempseed oil, cottonseed oil, sesame oil, rapeseed oil, peanut oil, camellia oil, olive oil, coconut oil and sardine oil; epoxided natural fats and oils such as epoxided soybean oil; unsaturated carboxylic acid such as acrylic acid, butenoic acid, crotonic acid, vinyl acetic acid methacrylic acid, pentenoic acid, angelic acid, tiglic acid, 2-pentenoic acid, 3-pentenoic acid, α-ethylacrylic acid, β-methylcrotonic acid, 4-pentenoic acid, 2-hexenoic acid, 2-methyl-2-pentenoic acid, 3-methyl-2-pentenoic acid, α-ethylcrotonic acid, 2,2-dimethyl-3-butenoic acid, 2-heptenoic acid, 2-octenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, eicosenoic acid, docosenoic acid, erucic acid, tetracocenoic acid, mycolipenic acid, 2,4-pentadienic acid, 2,4-hexadienic acid, diallyl acetic acid, geranic acid, 2,4-decadienic acid, 2,4-dodecadienic acid, 9,12-hexadecadienic acid, 9,12-octadecadienic acid, hexadecatrienic acid, linolic acid, linolenic acid, octadecatrienic acid, eicosadienic acid, eicosatrienic acid, eicosatetraenic acid, ricinoleic acid, eleosteric acid, oleic acid, eicosapentaenic acid, erucic acid, docosadienic acid, docosatrienic acid, docosatetraenic acid, docosapentaenic acid, tetracosenoic acid, hexacosenoic acid, hexacodienoic acid, octacosenoic acid, and tetraaconitic acid; and ester, acid amide or anhydride of unsaturated carboxylic acid above.

Suitable examples of the acid anhydrides are 4-methylcyclohexa-4-ene-1,2-dicarboxylic acid anhydride (4-MTHPA), 1,2,3,4,5,8,9,10-octahydronaphthalene-2,3-dicarboxylic acid anhydride, bicyclo(2,2,2)octa-5-ene-2,3-dicarboxylic acid anhydride (BODA), bicyclo(2,2,1)octa-7-ene-2,3,5,6-tetracarboxylic acid-2,3,5,6-dianhydride, maleo-pimaric acid (M-PA), bicyclo(2,2,1-)hepta-5-ene-2,3-dicarboxylic acid anhydride (NBDA), X-methylbicyclo(2,2,1)hepta-5-ene-2,3-dicarboxylic acid anhydride (XMNA), and 7-oxabicyclo(2,2,1)hepta-5-ene-2,3-dicarboxylic acid anhydride.

The epoxy compound includes unsaturated glycidyl ester and unsaturated glycidyl ether having, for example, the formulas (1) and (2) below:

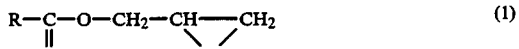

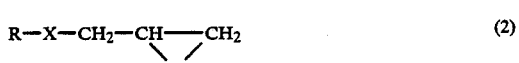

wherein R is a $C_2$-$C_{18}$ hydrocarbon group containing ethylenically unsaturated bond and X is —$CH_2$—O— or Examples are glycidyl acrylate, glycidyl methacrylate, glycidyl itaconate, allylglycidyl ether, 2-methylallyl glycidyl ether, styrene-p-glycidyl ether.

The mutual compatibilizer further includes unsaturated alcohol such as allyl alcohol, crotyl alcohol, methylvinyl carbinol, allyl carbinol, methylpropenyl carbinol, 4-penten-1-ol, 10-undecene-1-ol, propargyl alcohol, 1,4-pentadiene-3-ol, 1,4-hexadiene-3-ol, 3,5-hexadiene-2-ol, 2,4-hexadiene-1- ol, alcohol of the formula: $C_nH_{2n-5}OH$, $C_nH_{2n-7}OH$ or $C_nH_{2n-9}OH$ (n is an integer), 3-butene-1,2-diol, 2,5-dimethyl-3-hexene-2,5-diol, 1,5-hexadiene-3,4-diol or 2,6-octadiene-4,5-diol; and unsaturated amine such as that where an OH group of the unsaturated alcohol is replaced by an —$NH_2$ group. There may be further included various polymers and rubbers of low molecular weight (e.g., 500–10,000) into which said compatibilizing agents are introduced.

Rubber-like material (B) in this invention means natural and synthetic polymer materials which are elastic at room temperature.

As examples of the rubber-like materials, mention may be made of natural rubber, butadiene polymer, butadiene-styrene copolymer (including all of random copolymers, block copolymers including SEBS (styrene-ethylene-butylene-styrene block copolymer) rubber, SBS (styrene-butadiene-styrene block copolymer) rubber, etc. graft copolymers, etc.), isoprene polymer, chlorobutadiene polymers, butadiene-acrylonitrile copolymer, isobutylene polymer, isobutylene-butadiene copolymer, isobutylene-isoprene copolymer, acrylate ester copolymer, ethylene-propylene copolymer, ethylene-butene copolymer, ethylene-propylene-styrene copolymer, ethylene-propylene-non-conjugated diene copolymer, Thiokol rubber, polysulfide rubber, polyurethane rubber, polyether rubber e.g., polypropylene oxide, epichlorohydrin rubber, polyester elastomer, polyamide elastomer, etc.

These rubber-like materials may be produced by any methods (e.g., emulsion polymerization, solution polymerization, etc.) and with any catalysts (e.g., peroxides, trialkylaluminum, lithium halides, nickel catalysts).

Furthermore, there may also be used those which have various crosslinking degrees, various proportions of microstructures (e.g., cis structure, trans structure, vinyl group, etc.) or various average rubber particle sizes.

Various polymers such as random copolymers, block copolymers, graft copolymers, etc. may be used as the copolymers for rubber-like materials in this invention.

Modification of rubber-like materials (B) may be effected by any methods of introduction of at least one of the mutual compatibilizers (C) mentioned above. Generally, this is effected by copolymerization (including all of random copolymerization, block copolymerization, graft copolymerization, etc.) and reaction with main chain, side chain and terminal of molecule.

The particularly preferred compatibilizer used to modify the rubber-like materials is one which is reactive with a compatibilizer that is used as the above component (C).

When the compatibilizer (C) is unsaturated carboxylic acid or acid anhydride such as maleic anhydride (MAH), maleic acid, fumaric acid, itaconic acid, acrylic acid, bicyclo(2,2,1) hepta-5-ene-2,3-dicarboxylic acid anhydride (NBDA), it is preferable that the rubber-like materials are modified with epoxy group containing unsaturated monomers such as glycidyl acrylate (GA), glycidyl methacrylate (GMA) and allylglycidyl ether; unsaturated alcohols such as allyl alcohol and crotyl alcohol; unsaturated amines such as allyl amine and diallyl amine; and phenols.

When the compatibilizer (C) is unsaturated alcohol such as allyl alcohol and crotyl alcohol, it is preferable that the rubber-like materials are modified with epoxy group containing unsaturated monomers such as glycidyl acrylate, glycidyl methacrylate and allylglycidyl ether; unsaturated carboxylic acids or acid anhydrides such as maleic anhydride, maleic acid, fumaric acid, itaconic acid, acrylic acid and NBDA; and maleimides.

When the compatibilizer (C) is epoxy group containing unsaturated monomer such as glycidyl acrylate, glycidyl methacrylate and allyglycidyl ether, it is preferable that the rubber materials are modified with the above-listed unsaturated carboxylic acids or acid anhydrides, the above-listed unsaturated amines, the above-listed unsaturated alcohols and the maleimides.

When the compatibilizer (C) is unsaturated amine as listed above, it is preferable that the rubber-like materials are modified with the above-listed epoxy group containing unsaturated monomers and the above-listed unsaturated carboxylic acids or acid anhydrides.

Preferable rubber-like materials are ethylene-propylene copolymer rubber and ethylene-propylene-nonconjugated diene copolymer rubber (MAH-EPR) which are modified with maleic anhydride.

In the present composition, the polyphenylene ether (A) is 1-65% by weight, the rubber-like material (B) is 1-20% by weight, the mutual compatibilizer (C) is 0.01-5% by weight, and the polyamide resin (E) is 30-97.99% by weight, preferably the (A) is 1-60% by weight, the (B) is 1-15% by weight, the (C) is 0.01-3% by weight, and the (E) is 35-97.99% by weight, more preferably the (A) is 1-60% by weight, the (B) is 1-10% by weight, the (C) is 0.01-2% by weight, and the (E) is 40-97.99% by weight. The above percentage is based on the total weight of the composition.

If the (A) is less than 1% by weight, heat resistance, dimension stability and processability degrade. If the (A) is 65% by weight or more, the composition (D) which comprises the (A), (B) and (C), does not form a disperse phase, thereby degrading impact strength, processability and appearance.

If the (B) is 1% by weight or less, impact strength decreases. If 20% by weight or more, heat resistance and appearance degrade.

If the (C) is less than 0.01% by weight, the average particle size of the disperse phase of the composition (D) becomes larger, thereby decreasing impact strength. If 5% by weight or more, no significant effect is expected and in turn processability is often degraded.

If the (E) is less than 35% by weight, the matrix phase is not formed and thus impact strength, processability and appearance are degraded. If 97.99% by weight or more, heat resistance, dimension stability, moisture absorption and processability are not improved.

In the present composition, the suitable weight average particle size of the disperse phase (D) is 2 microns or less, more preferably, 1 micron or less.

Preferred embodiments of this invention may be to use the resin composition in the form of reinforced composite materials with reinforcing fibers such as glass fiber, carbon fiber, polyamide fiber and metallic whisker and composite materials with addition of inorganic fillers or flame retardants such as silica, alumina, calcium carbonate, talc, mica, carbon black, $TiO_2$, $ZnO$ and $Sb_2O_3$ and furthermore, lubricants, nuclear agents, plasticizers, dyes, pigments antistatic agents, antioxidants, weatherability providing agents, etc.

Any process is used to prepare the present resin composition.

Melt-blending methods for the components are the best from an economical point of view, although it is possible to blend the components in a solution and evaporate the solvent or precipitate in a non-solvent. Melt-blending is carried out in a single-screw or a twin-screw extruder, a kneader or so, preferably a high-speed twin-screw extruder.

Before kneading, it is preferable to uniformly blend powder or pellets of the component resins in a tumbler or a Henschel mixer. The first blending above is not always necessary. Alternatively, each resin may be fed to a kneader through a metering apparatus.

Resin composition, after kneaded, is molded according to injection, extrusion and the like.

The resin composition of this invention is used as shaped articles, sheets, tubes, films, fibers, laminates, coating materials, etc. made by injection molding or extrusion molding, especially as automobile parts such as bumper, instrument panel, fender, trim, door panel, wheel cover, side protector, garnish, trunk-lid, bonnet, roof, etc., interior and exterior materials and mechanical parts required to have heat resistance.

Furthermore, the resin composition is used as parts for motor bicycles such as covering material, muffler cover, leg shield, etc. and electrical and electronic parts such as housing, chassis, connector, base for printed circuit, pulley and other parts required to have strength and heat resistance.

This invention is explained referring to examples below, wherein they are merely illustrative ones and this invention is not limited to them. Hardness test, heat distortion temperature test (H.D.T.), Izod impact strength test (3.2 mm thick) and M.I. are observed in accordance with JIS K7202, JIS K7207, JIS K7110 and JIS K7210, respectively.

Polyphenylene ether and modified rubber-like materials used in the examples and comparative examples are obtained in the following manner.

1. Polyphenylene ether

A solution is prepared by dissolving 2,6-dimethylphenol in toluene and methanol. The solution is oxidization-polymerized with the addition of manganese chloride and ethylene diamine under oxygen atmosphere at a reaction temperature of 30° C. to obtain polyphenylene ether.

2. Modified rubber-like materials (1) (MAH-EPR)

Ethylene/propylene rubber is previously mixed with maleic anhydride and tert-butylperoxy laurate. The mixture is subjected to reaction in an extruder of 30 mmφ in screw diameter and L/D=28 at a barrel temperature of 230° C. and at a screw rotation of 60 rpm and modified rubber strand discharged from the die is cooled with water and then pelletized.

As polyamide, rubber materials and mutual compatibilizer, commercially available ones were used as shown below.

3. Polyamide

|  |  | Number average molecular weight | Content of end amine group (mmole/kg) |
|---|---|---|---|
| UNITIKA Nylon 6 | A1030BRL | 17500 | 60 |
|  | A1030BRT | 25500 | 42 |
|  | 1030A | 14000 | 94 |
|  | A1025BRL | 14000 | 71 |
|  | A1020BRL | 12000 | 84 |

4. Rubber-like materials

Ethylene/propylene rubber SUMITOMO ESPRENE E120p manufactured by Sumitomo Chemical Co., Ltd.

EXAMPLE 1

Fifty percent by weight of polyphenylene ether having 0.48 deciliter/gram of the reduced viscosity $\eta_{sp/c}$ as measured in chloroform at 25° C., 10% by weight of maleic anhydride grafted ethylenepropylene rubber wherein 0.7% by weight of maleic anhydride based on the rubber was grafted, and 0.6 part by weight of maleic anhydride based on 100 parts by weight of the other components, were charged to a continuous twin-screw kneader ("TEX-44 ®" manufactured by Nihon Seikousho) through a first hopper. Forty percent by weight of polyamide (UNITIKA Nylon 6 A1025 BRL), and 0.5 part by weight of 2-tert-butyl-6-(3'-tert-butyl-5'-methyl-2'-hydroxybenzyl)-4-methylbenzylacrylate (trade name "SUMILIZER ® GM" manufactured by Sumitomo Chemical Co., Ltd.) based on 100 parts by weight of the total of the polyphenylene ether, the maleic anhydride grafted ethylene-propylene rubber and the polyamide, and 0.5 part by weight of pentaerythritoltetrakis (β-laurylthiopropionate)(trade name "SUMILIZER ® TPD" manufactured by Sumitomo Chemical Co., Ltd.) based on 100 parts by weight of the total of the polyphenylene ether, the maleic anhydride grafted ethylene-propylene rubber and the polyamide as antioxidizing agents, were also charged to the kneader through a second hopper located between the first hopper and the air vent by the use of a metering feeder. The mixture was melted and kneaded at a cylinder temperature of 260° C. at a screw rotation of 380 rpm.

The resulting composition was injection-molded by IS 150E of Toshiba Machine Co. to make test specimens for determining their properties and observing their appearance.

The test results are shown in Table 1.

A specimen which had not been subjected to Izod test, was processed by a microtome to produce a smooth surface of the composition. Then, the specimen was immersed in tetrachloromethane which is a good solvent for polyphenylene ether, to effect the etching of polyphenylene ether. Particle size of disperse phase consisting of polyphenylene ether and maleic anhydride grafted rubber, was measured by observing the resultant specimen through a scanning electron microscope. The particle size was obtained as a weight average of maximum diameters of each dispersed particle.

The result is shown in Table 1.

COMPARATIVE EXAMPLE 1

Example 1 was repeated except that the same nylon as charged through the second hopper in Example 1, was charged through the first hopper together with the other materials.

The results are shown in Table 1.

EXAMPLE 2

Example 1 was repeated except that acrylic acid was used in place of maleic anhydride.

The results are shown in Table 1.

EXAMPLES 3 AND 4

Example 1 was repeated except that ethylene-propylene rubber was used in place of maleic anhydride grafted ethylene-propylene rubber and that glycidyl methacrylate or oleic amide was used as a mutual compatibilizer.

The results are shown in Table 1.

EXAMPLE 5

Example 1 was repeated except that 1.2 part by weight of maleic anhydride was used.

The results are shown in Table 1.

COMPARATIVE EXAMPLES 2 AND 3

Example 1 was repeated except that 5 parts by weight or 0 part by weight of maleic anhydride was used.

The results are shown in Table 1.

Examples 1 to 5 and comparative examples 1–3 indicate that particle size of disperse phase and properties of the composition depend upon whether nylon is mixed after kneading polyphenylene ether, rubber-like material and mutual compatibilizer or mixed together with these materials.

They also indicate that preferable mutual compatibilizers are maleic anhydride, acrylic acid, glycidyl methacrylate and oleic amide, more preferably, maleic anhydride.

They also indicate that if maleic anhydride is not used or 5 parts by weight or more of maleic anhydride is used, properties and appearance are degraded.

EXAMPLES 6 TO 10

Example 1 was repeated except that nylon 6 which had a number average molecular weight of 14,000, 17,500, 25,500, 30,000 or 35,000, was used.

The results are shown in Table 2.

COMPARATIVE EXAMPLE 4

Example 1 was repeated except that nylon 6 which had a number average molecular weight of 12,000, was used.

The results are shown in Table 2.

These results indicate that if the number average molecular weight of nylon 6 is less than 14,000, appearance is degraded.

EXAMPLES 11 AND 12

Example 1 was repeated except that nylon 6 which had a number average molecular weight of 17,500 or 20,000 and a content of end amino group of 60 or 92 mmole/kg (nylon), was used.

The results are shown in Table 2.

COMPARATIVE EXAMPLE 5

Example 1 was repeated except that nylon 6 which had a number average molecular weight of 25,500 and a content of end amino group of 40 mmole/kg(nylon), The result are shown in Table 2.

Examples 6 to 8 indicate that there is no significant difference in impact resistance between 14,000 and 25,000 of the number average molecular weight of nylon 6. However, examples 11 and 12 and comparative example 5 reveal that if nylon 6 in which the content of end amino group is 40 mmole/kg(nylon) is used, impact resistance is degraded.

EXAMPLES 13 AND 14

Example 1 was repeated except that polyphenylene ether which has a reduced viscosity of 0.48–0.52, was used.

The results are shown in Table 3.

COMPARATIVE EXAMPLES 6 AND 7

Example 1 was repeated except that polyphenylene ether which has a reduced viscosity of 0.22 or 0.60, was used.

The results are shown in Table 3.

These results indicate that it is not preferably from the viewpoint of properties that polyphenylene ether has a reduced viscosity of less than 0.40 and of 0.58 or more.

EXAMPLES 15 AND 16

Example 1 was repeated except that normal EP rubber or hydrogenated styrene-butadiene-styrene rubber (SEBS) was used in place of maleic anhydride grafted ethylene-propylene rubber.

The results are shown in Table 3.

EXAMPLES 17 AND 18

Example 1 was repeated except that 15% or 50% by weight of maleic anhydride grafted ethylene-propylene rubber was used.

The results are shown in Table 3.

COMPARATIVE EXAMPLES 8 AND 9

Example 1 was repeated except that maleic anhydride grafted ethylene-propylene rubber was not added or that 22% by weight of maleic anhydride grafted ethylene-propylene rubber was used.

The results are shown in Table 4.

These results indicate that the proportion of maleic anhydride ethylene-propylene rubber is preferably 1 to 20% by weight.

EXAMPLE 19

Example 1 was repeated except that styrene-butadiene-styrene block copolymer rubber (trade name "Kaliflex® TR1101: SBS rubber manufactured by Shell Chemical Co.) was used in place of maleic anhydride grafted ethylene-propylene rubber and UBE Nylon 6,6® 2020B was used as nylon.

The results are shown in Table 4.

EXAMPLE 20

Example 1 was repeated except that bicyclo [2,2,1]hepta-5-ene-2,3-dicarboxylic acid anhydride (NBDA) grafted ethylene-propylene rubber was used as a modified rubber-like material in place of maleic anhydride grafted ethylene-propylene rubber (MAH-EPR).

The NBDA grafted ethylene-propylene rubber was prepared in the same manner as the preparation of MAH-EPR except that maleic anhydride was replaced with NBDA.

The results are shown in Table 5.

EXAMPLE 21

Example 1 was repeated except that 4-methylcyclohexa-4-ene-1,2-dicarboxylic acid anhydride (4-MTHPA) grafted ethylene-propylene rubber was used as a modified rubber-like material in place of MAH-EPR.

The 4-MTHPA grafted ethylene-propylene rubber was prepared in the same manner as the preparation of MAH-EPR except that maleic anhydride was replaced with 4-MTHPA.

The results are shown in Table 5.

EXAMPLE 22

Example 1 was repeated except that glycidyl methacrylate (GMA) grafted ethylene-propylene rubber was used as a modified rubber-like material in place of MAH-EPR.

The GMA grafted ethylene-propylene rubber was prepared in the same manner as the preparation of MAH-EPR except that maleic anhydride was replaced with GMA.

The results are shown in Table 5.

EXAMPLE 23

Example 1 was repeated except that glycidyl methacrylate (GMA) was used as a mutual compatibilizer in place of maleic anhydride.

The results are shown in Table 5.

EXAMPLE 24

Example 1 was repeated except that glycidyl methacrylate (GMA) was used as a mutual compatibilizer in place of maleic anhydride and NBDA grafted ethylene-propylene rubber was used as a modified rubber-like material.

The results are shown in Table 5.

EXAMPLE 25

Example 1 was repeated except that glycidyl methacrylate-ethylene-methyl acrylate copolymer (GMA-EMA: GMA 1.5 wt. %, Ethylene 56.5 wt. %, MA 42 wt. %, manufactured by Sumitomo Chemical Co., Ltd.) was used as a modified rubber-like material in place of MAH-EPR.

The results are shown in Table 5.

EXAMPLE 26

Example 1 was repeated except that maleic anhydride grafted ethylene-butene rubber was used as a modified rubber-like material in place of MAH-EPR.

The maleic anhydride grafted ethylene-butene rubber was prepared in the same manner as the preparation of MAH-EPR except that ethylene-propylene rubber was replaced with ethylene-butene rubber (ethylene 80 wt. %, butene 20 wt. %, manufactured by Sumitomo Chemical Co., Ltd.).

The results are shown in Table 5.

EXAMPLE 27

Example 1 was repeated except that maleic anhydride grafted ethylene-butene copolymer was used as a modified rubber-like material in place of MAH-EPR.

The maleic anhydride grafted ethylene-butene copolymer was prepared in the same manner as the preparation of MAH-EPR except that ethylene-propylene rubber was replaced with ethylene-butene copolymer ($MI_{2.16\ kg}^{190°\ C.}$=3.9 g/10 minutes, density 0.895 g/cm³, and the content of butene 18 wt. %, manufactured by Sumitomo Chemical Co., Ltd.).

The results are shown in Table 5.

TABLE 1

| | Composition (The first feeder) | | | (The second feeder) Nylon wt % | M.I. (280 °C., 10 kg load) g/10 min. | Izod impact kg · cm/cm | H.D.T. °C. | Average particle size of disperse phase μm | Appearance |
|---|---|---|---|---|---|---|---|---|---|
| | PPE wt. % | Rubber wt % | Mutual compatibilizer Part by weight | | | | | | |
| Example 1 | 50 | MAH-EPR 10 | Maleic anhydride 0.6 | UNITIKA Nylon A1025BRL 40 | 18 | 62 | 114 | 0.8 | |
| Comparative Example 1 | 50 | MAH-EPR 10 | Maleic anhydride 0.6 (All the components were charged throught the first feeder) | UNITIKA Nylon A1025BRL 40 | 125 | 6.0 | 120 | 3.5 | |
| Example 2 | 50 | MAH-EPR 10 | Acrylic acid 0.6 | UNITIKA Nylon A1025BRL 40 | 15 | 15 | 115 | 1.2 | |
| Example 3 | 50 | EPR 10 | Glycidyl methacrylate 0.6 | UNITIKA Nylon A1025BRL 40 | 4 | 23 | 114 | 0.9 | |
| Example 4 | 50 | EPR 10 | Oleic amide 0.6 | UNITIKA Nylon A1025BRL | 24 | 15 | 109 | 1.5 | |
| Example 5 | 50 | MAH-EPR 10 | Maleic anhydride 1.2 | UNITIKA Nylon A1025BRL 40 | 10 | 58 | 110 | 0.8 | |
| Comparative Example 2 | 50 | MAH-EPR 10 | Maleic anhydride 5.0 | UNITIKA Nylon A1025BRL 40 | 6 | 32 | 115 | 0.7 | Dark brown no good |
| Comparative Example 3 | 50 | MAH-EPR 10 | — | UNITIKA Nylon A1025BRL 40 | 32 | 6.7 | 109 | 3.2 | |

TABLE 2

| | Composition | | | Nylon 6 wt % | M.I. (280 °C., 10 kg load) g/10 min. | Izod impact kg · cm/cm | H.D.T. °C. | Average particle size of disperse phase μm | Appearance |
|---|---|---|---|---|---|---|---|---|---|
| | PPE wt % | Rubber wt % | Mutual compatibilize Part by weight | | | | | | |
| Example 6 | 50 | MAH-EPR 10 | Maleic anhydride 0.6 | M.W. 14000 40 | 39 | 59 | 114 | 0.8 | Good |
| Example 7 | 50 | MAH-EPR 10 | Maleic anhydride 0.6 | M.W. 17500 40 | 34 | 61 | 112 | 0.7 | Good |
| Example 8 | 50 | MAH-EPR 10 | Maleic anhydride 0.6 | M.W. 25500 40 | 32 | 50 | 113 | 0.7 | Good |
| Example 9 | 50 | MAH-EPR 10 | Maleic anhydride 0.6 | M.W. 30000 40 | 2.1 | 48 | 112 | 0.7 | Good |
| Comparative Example 4 | 50 | MAH-EPR 10 | Maleic anhydride 0.6 | M.W. 12000 40 | 59 | 58 | 118 | 0.8 | Bad |
| Example 10 | 50 | MAH-EPR 10 | Maleic anhydride 0.6 | M.W. 35000 40 | 8 | 32 | 111 | 0.7 | Good |
| Example 11 | 50 | MAH-EPR 10 | Maleic anhydride 0.6 | M.W. 20000 C.E.A. 60 40 | 18 | 62 | 111 | 0.7 | Good |
| Example 12 | 50 | MAH-EPR 10 | Maleic anhydride 0.6 | M.W. 17500 C.E.A. 92 40 | 2.5 | 68 | 106 | 0.7 | Good |
| Comparative Example 5 | 50 | MAH-EPR 10 | Maleic anhydride 0.6 | M.W. 25500 C.E.A. 40 40 | 60 | 42 | 115 | 0.8 | Good |

M.W. = Molecular weight
C.E.A. = Content of end amine group

TABLE 3

| | Composition | | | Nylon wt % | M.I. (280 °C., 10 kg load) g/10 min. | Izod impact kg · cm/cm | H.D.T. °C. | Appearance |
|---|---|---|---|---|---|---|---|---|
| | PPE wt % | Rubber wt % | Mutual compatibilizer Part by weight | | | | | |
| Example 13 | 50 $\eta_{sp/c}$ 0.48 | MAH-EPR 10 | Maleic anhydride 0.6 | UNITIKA Nylon 6 A1030BRL 40 | 18 | 62 | 113 | Good |
| Example 14 | 50 $\eta_{sp/c}$ 0.52 | MAH-EPR 10 | Maleic anhydride 0.6 | UNITIKA Nylon 6 A1030BRL 40 | 17 | 60 | 108 | Good |
| Comparative Example 6 | 50 $\eta_{sp/c}$ 0.22 | MAH-EPR 10 | Maleic anhydride 0.6 | UNITIKA Nylon 6 A1030BRL 40 | 38 | 32 | 119 | Good |

TABLE 3-continued

| | Composition | | | | M.I. (280 °C., 10 kg load) g/10 min. | Izod impact kg · cm/cm | H.D.T. °C. | Appearance |
|---|---|---|---|---|---|---|---|---|
| | PPE wt % | Rubber wt % | Mutual compatibilizer Part by weight | Nylon wt % | | | | |
| Comparative Example 7 | 50 $\eta_{sp/c}$ 0.60 | MAH-EPR 10 | Maleic anhydride 0.6 | UNITIKA Nylon 6 A1030BRL 40 | 8 | 42 | ·102 | Bad |
| Example 15 | " | EPR 10 | Maleic anhydride 0.6 | UNITIKA Nylon 6 A1030BRL 40 | 35 | 59 | 118 | Good |
| Example 16 | " | SEBS 10 | Maleic anhydride 0.6 | UNITIKA Nylon 6 A1030BRL 40 | ·56 | 58 | 128 | Good |
| Example 17 | 45 | MAH-EPR 15 | Maleic anhydride 0.6 | UNITIKA Nylon 6 A1030BRL 40 | 13 | 69 | 101 | Good |
| Example 18 | 55 | MAH-EPR 5 | Maleic anhydride 0.6 | UNITIKA Nylon 6 A1030BRL 40 | 51 | 16 | 136 | Good |

TABLE 4

| | Composition | | | | M.I. (280 °C., 10 kg load) g/10 min. | Izod impact kg · cm/cm | H.D.T. °C. | Appearance |
|---|---|---|---|---|---|---|---|---|
| | PPE wt % | Rubber wt % | Mutual compatibilizer Part by weight | Nylon wt % | | | | |
| Comparative Example 8 | 60 | — | Maleic anhydride 0.6 | UNITIKA Nylon 6 A1030BRL 40 | 68 | 5.5 | 142 | Good |
| Comparative Example 9 | 48 | 22 | Maleic anhydride 0.6 | UNITIKA Nylon 6 A1030BRL 40 | 12 | 58 | 85 | Bad |
| Example 19 | 50 | SBS 10 | Maleic anhydride 0.6 | UBE Nylon 6.6 2020B 40 | 20 | 14 | 146 | Good |

TABLE 5

| | Composition | | | | | |
|---|---|---|---|---|---|---|
| | (The first feeder) | | | (The second feeder) | | |
| | PPE wt % | Rubber wt % | Mutual compatibilizer Part by weight | Nylon wt % | Sumilizer GM Part by weight | Sumilizer TPD Part by weight |
| Example 20 | 50 | NBDA grafted EPR 10 | Maleic anhydride 0.6 | UNITIKA Nylon A1025BRL 40 | 0.5 | 0.5 |
| Example 21 | 50 | 4-MTHPA grafted EPR 10 | Maleic anhydride 0.6 | UNITICA Nylon A1025BRL 40 | 0.5 | 0.5 |
| Example 22 | 50 | GMA grafted EPR 10 | Maleic anhydride 0.6 | UNITICA Nylon A1025BRL 40 | 0.5 | 0.5 |
| Example 23 | 50 | MAH-EPR 10 | Glycidyl methacrylate 0.6 | UNITICA Nylon A1025BRL 40 | 0.5 | 0.5 |
| Example 24 | 50 | NBDA grafted EPR 10 | Glycidyl methacrylate 0.6 | UNITICA Nylon A1025BRL 40 | 0.5 | 0.5 |
| Example 25 | 50 | GMA-EMA 10 | Maleic anhydride 0.6 | UNITICA Nylon A1025BRL 40 | 0.5 | 0.5 |
| Example 26 | 50 | MAH grafted ethylene-butene rubber 10 | Maleic anhydride 0.6 | UNITICA Nylon A1025BRL 40 | 0.5 | 0.5 |
| Example 27 | 50 | MAH grafted butene copolymer 10 | Maleic anhydride 0.6 | UNITICA Nylon A1025BRL 40 | 0.5 | 0.5 |

| | M.I. (280 °C., 10 kg load) g/10 min. | Izod impact kg · cm/cm | H.D.T. °C. | Average particle size of disperse phase μm | Appearance |
|---|---|---|---|---|---|
| Example 20 | 20 | 45 | 115 | 0.7 | Good |
| Example 21 | 15 | 47 | 114 | 0.8 | Good |
| Example 22 | 10 | 68 | 116 | 0.7 | Good |
| Example 23 | 17 | 69 | 116 | 0.7 | Good |
| Example 24 | 18 | 65 | 118 | 0.8 | Good |
| Example 25 | 9.5 | 60 | 117 | 0.9 | Good |
| Example 26 | 10 | 47 | 118 | 0.9 | Good |
| Example 27 | 12 | 32 | 117 | 0.7 | Good |

According to the present invention, a resinous composition which comprises a disperse phase consisting of polyphenylene ether and rubber-like material, a matrix phase of polyamide resin and a mutual compatibilizer compatible or reactive with both of the phases wherein the disperse phase has a specific range of particle size, is provided. The composition has an improved impact resistance without the significant degradation of heat resistance, as compared with prior composition.

According to the present invention, a resinous composition excellent in properties and appearance is also provided by specifying the viscosity of polyphenylene ether and the molecular weight of polyamide so as to make smaller the particle size of disperse phase and by specifying the content of end amine group of polyamide so as to promote the compatibility of polyamide with the disperse phase.

The compositions are easily processed into shaped articles, sheets, films, tubes, coating materials and the like by molding methods employed for thermoplastic resins such as injection molding, extrusion molding, etc. The compositions provide a high-quality product which is well-balanced in terms of properties such as heat resistance, impact resistance, processability, dimension stability, appearance and so on.

We claim:

1. A thermoplastic resin composition comprising a matrix of polyamide resin (E) and a disperse phase of a composition (D) which is obtained by melting and mixing the composition (D) and the polyamide resin (E), said composition (D) being obtained by melting and mixing a polyphenylene ether (A) together with a rubber-like material (B) and a mutual compatibilizer (C).

said polyphenylene ether (A) being obtained by oxidation polymerization of at least one phenol compound represented by the formula:

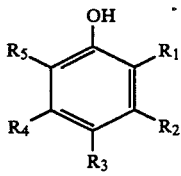

wherein $R_1$, $R_2$, $R_3$, $R_4$ and $R_5$ represent a hydrogen atom, a halogen atom or a substituted or unsubstituted hydrocarbon residue, with a proviso that at least one of them is a hydrogen atom, and said polyphenylene ether (A) having a reduced viscosity $\eta_{sp/c}$ of 0.40–0.58 deciliter/gram, said mutual compatibilizer (C) being reactive with said polyphenylene ether and reactive with said polyamide resin, and said polyamide resin (E) having a number average molecular weight of 14,000–30,000 and an end amino group content of 50–90 mmole/kg, wherein the thermoplastic resin composition constitutes 1–65 wt. % of said polyphenylene ether (A), 1–20 wt. % of said rubber-like material (B), 0.01–5 wt. % of said mutual compatibilizer (C) and 35–97.99 wt. % of said polyamide resin (E), based on the total weight of said thermoplastic resin composition, and the weight average particle size of said disperse phase is 2 microns or less.

2. A thermoplastic resin composition according to claim 1 wherein the mutual compatibilizer (C) is at least one compound selected from the compounds which are capable of melting in and grafting to polyphenylene ether and contain in its molecule at least one of carboxyl group, acid anhydride group, acid amide group, imide group, carboxylate ester group, epoxy group, amino group, isocyanate group, a group containing oxazoline ring and hydroxyl group.

3. A thermoplastic resin composition according to claim 2 which said mutual compatibilizer (C) is maleic anhydride and addition amount of said maleic anhydride is 3% or less by weight based on said polyphenylene ether (A).

4. A thermoplastic resin composition according to claim 1 wherein the reduced viscosity $\eta_{sp/c}$ of said polyphenylene ether (A) is 0.45–0.52 deciliter/gram.

5. A thermoplastic resin composition according to claim 1 wherein said rubber-like material (B) is saturated polyolefine rubber or styrene copolymer rubber.

6. A thermoplastic resin composition according to claim 5 wherein said saturated polyolefine rubber is maleic anhydride modified ethylene-propylene rubber.

7. A thermoplastic resin composition according to claim 1 wherein said rubber-like material (B) is styrene-ethylene-butylene-styrene block copolymer rubber or styrene-butadiene-styrene block copolymer rubber.

8. A thermoplastic resin composition according to claim 1 wherein the weight average particle size of said disperse phase is 1 micron or less.

9. A thermoplastic resin composition according to claim 3 wherein addition amount of maleic anhydride is 1.5% or less by weight based on said polyphenylene ether (A).

* * * * *